May 17, 1960

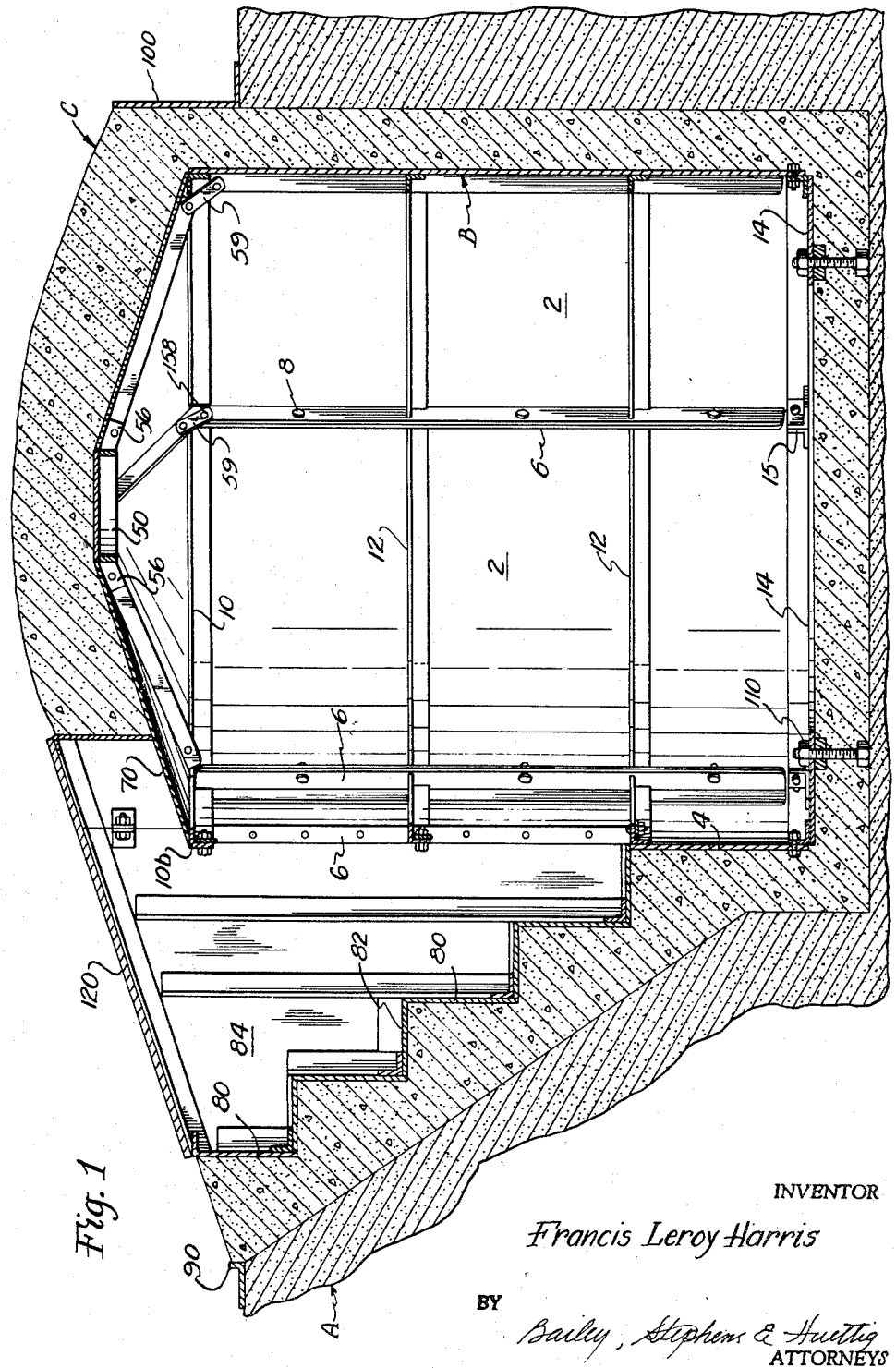

F. LE ROY HARRIS 2,936,504

PROCESS FOR MAKING A CONCRETE SHELTER

Filed Oct. 3, 1955

INVENTOR

*Francis Leroy Harris*

BY

*Bailey, Stephens & Huettig*

ATTORNEYS

May 17, 1960 F. LE ROY HARRIS 2,936,504
PROCESS FOR MAKING A CONCRETE SHELTER
Filed Oct. 3, 1955 5 Sheets-Sheet 3

INVENTOR
Francis Leroy Harris
BY
Bailey, Stephens & Huettig
ATTORNEYS

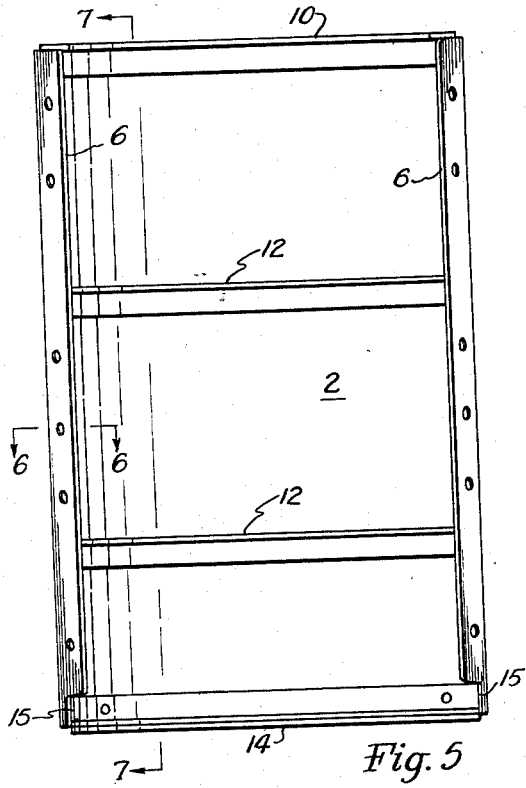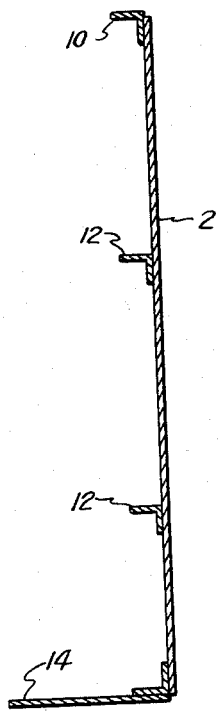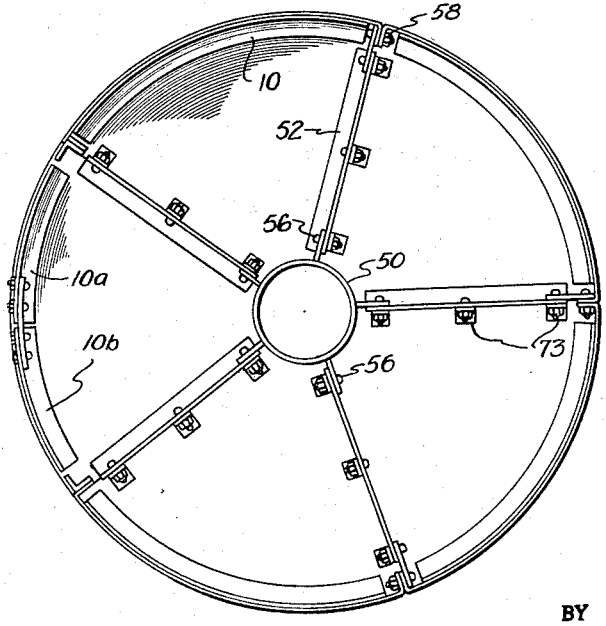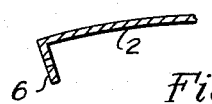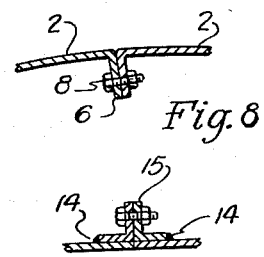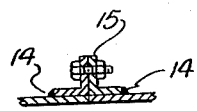

May 17, 1960   F. LE ROY HARRIS   2,936,504
PROCESS FOR MAKING A CONCRETE SHELTER
Filed Oct. 3, 1955   5 Sheets-Sheet 5

INVENTOR
Francis Leroy Harris
BY
Bailey, Stephens & Huettig
ATTORNEYS

United States Patent Office 2,936,504
Patented May 17, 1960

2,936,504

PROCESS FOR MAKING A CONCRETE SHELTER

Francis Le Roy Harris, Oklahoma City, Okla., assignor to Stormaster Tornado Shelter Co., a corporation of Oklahoma Application October 3, 1955, Serial No. 537,950

1 Claim. (Cl. 25—155)

This invention relates to a process of making a concrete shelter. In particular, the invention is directed to a process for constructing an underground shelter to afford protection against storms and bomb raids.

The objects of the invention are to produce a shelter which can be constructed quickly and permanently, and to produce a process by means of which a monolithic concrete structure can be quickly constructed.

In general, these objects are obtained by first fabricating a form having side walls composed of panels of arcuate shape, and a roof composed of panels comprised of circular segments. A stairwell panel form is used in conjunction with the side wall panels. These panels are bolted together on the inside of the form to assemble them into a complete form unit. After a hole of greater size than the form has been dug into the ground, the form is then assembled in the hole. Concrete is then poured in the space between the sides of the hole and the wall of the form, and over top of the form so as to produce a monolithic concrete structure. After the concrete has set, access to the interior of the form is made through the stairwell, and the form segments unbolted, and removed individually through the stairwell, thus leaving the completed concrete structure.

The means by which the objects of the invention are obtained are described more fully with reference to the accompanying drawings, in which:

Figure 1 is a cross-sectional view through a shelter constructed by pouring concrete around the form;

Figure 5 is an inside elevational view of a side wall panel;

Figure 6 is a cross-sectional view on the line 6—6 of Figure 5;

Figure 7 is a cross-sectional view on the line 7—7 of Figure 5;

Figure 8 is a cross-sectional detailed view of the joint between two wall panels;

Figure 9 is a detailed cross-sectional view of the joint between the pressure plates of two adjacent panels;

Figure 12 is a plan view of the roof truss;

Figure 3:
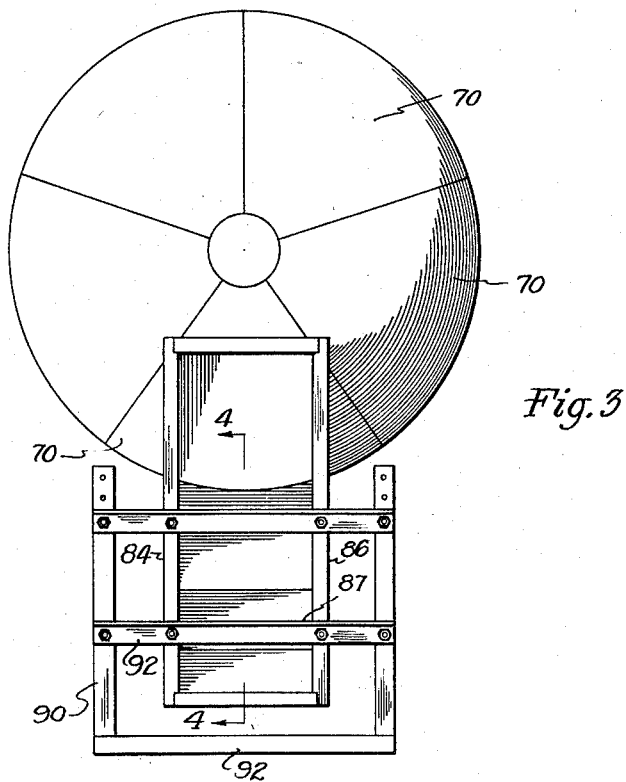
Figure 3 is a plan view of the assembled concrete form.

As seen in Figure 1, a hole has been dug in the ground A into which has been assembled a concrete form B. Concrete C has been poured between the wall of the form B and the ground A and over the form to make the side walls and roof of a shelter. After the concrete has set, the form is stripped from the interior of the shelter and removed through the stairwell to leave a completed monolithic concrete shelter.

The side walls of the form are composed of a plurality of similar panels 2 of arcuate section, as, for example, four in number, and a stairway accommodating panel 4. Each circular segment 2 has its longitudinal ends provided with an inwardly turned flange 6 which is adapted to abut, and would then be removably secured to a similar flange of an adjoining panel by means of bolts 8. The top edge of each panel 2 has an angle secured thereto to provide an inwardly turned flange 10, and is reinforced across its longitudinal length by transversely extending angle irons 12. The bottom edge of each panel has an inwardly extending pressure plate 14 removably bolted thereto, this pressure plate extending inwardly a distance at least as great as the natural slope angle of the concrete poured around the form as will be later described. Flanges 15 at the ends of adjoining pressure plates are bolted together. The stairway panel 4 is likewise provided with side flanges 6 for the purpose of being bolted to adjoining panels 2, a pressure plate 14, and also has inwardly extending top flange corresponding to flange 10.

However, the stairway panel is, in effect, divided into two parts 20 and 22, respectively. The upper flanges 10a and 10b of these two parts are connected by an angle 26 secured by bolts 28 to flange 10, a stairwell opening 30 being formed in parts 20 and 22 beneath angle 26. Substantially midway of opening 26 is an angle 32 for each of the panel parts, bolted together by angle 34. The bottom portion of panel parts 20 and 22 is filled out, with the bottom sill of the frame for opening 30 being bolted to an angle 38. The connection afforded by angles 26, 34 and 38 affords an expansion place for the wall panels of the shelter form for the purpose of stripping the panel from the completed shelter.

The roof of the shelter form is composed of a truss covered by a number of circular segment roof plates. As shown in Figures 1, 12, 13 and 14, there is a central circular ring 50 from which radially extend angle irons 52 secured by angle brackets and bolts 56 to ring 50, and by bolts 58 and knee braces 59 to flanges 6 of the side wall panels. Plates 70 are secured along one edge, respectively, to a roof rafter and have their outer edges terminating inwardly of the upper edge 72 of the side wall panels and resting on flanges 10. Adjacent roof plates have angle studs 73 secured by bolts 74 to rafters 52, note Figures 12 and 14.

Figure 4:
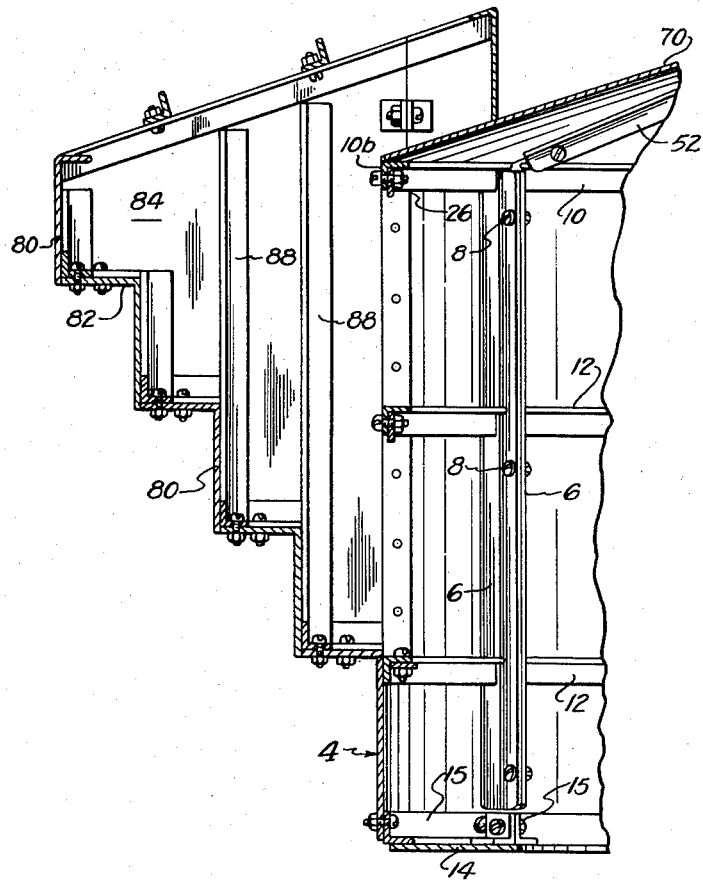
Figure 4 is a cross-sectional view on the line 4—4 of Figure 3.
Figure 13:
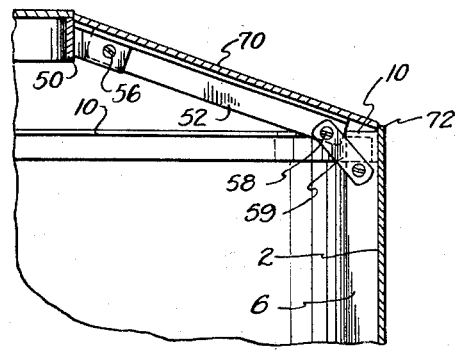
Figure 13 is a cross-sectional view of the roof.
Figure 14:
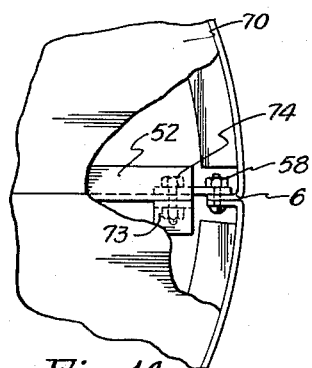
Figure 14 is a detailed plan view, with a portion cut away, of the joint between the roof truss and the side wall panels.
Figure 10:
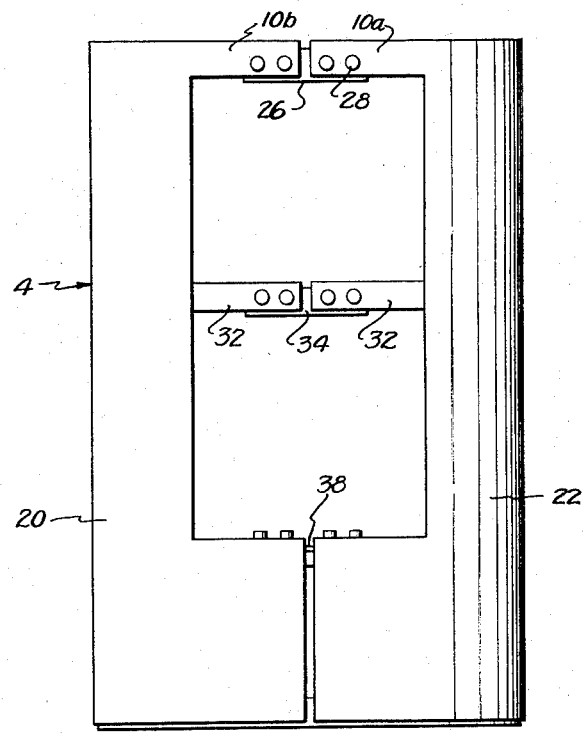
Figure 10 is a front elevational view of the stairwell panel.
Figure 11:
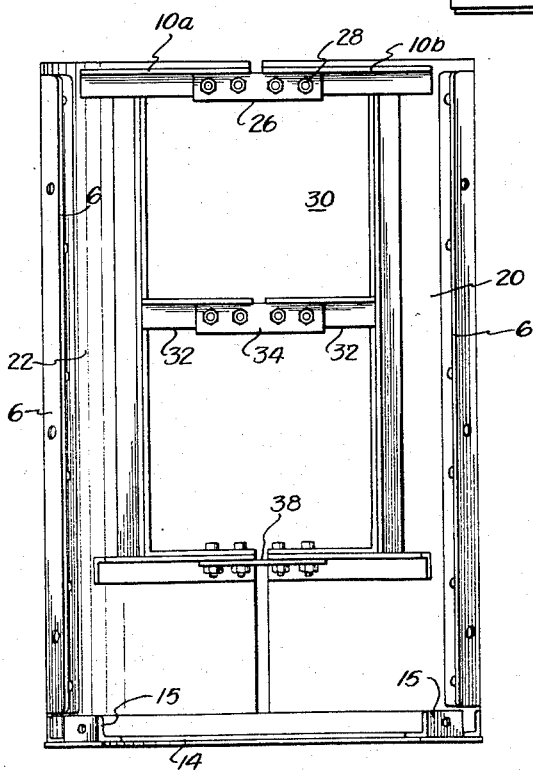
Figure 11 is a rear elevational view of the stairwell panel.

The stairwell form is composed of a plurality of risers 80 and treads 82 united together, and having sheet metal side panels 84 and 86 as best seen in Figure 3. Vertical reinforcing angles 88 are used. The sairwell form is bolted to angles 10a, 10b, 32, and 6, note Figures 1, 4, and 11, to hold the same in place during the pouring of concrete. It is noted that the top portion of side panels 84 and 86 is extended over top of the roof plates 70 so as to afford an opening through the portion of the roof. A curb form 90 is secured to the top of the stairwell form by cross arms 92.

Before pouring concrete, the edge of the hole is surrounded by an angle form 100, having its ends bolted to form 90, so that the poured concrete can be built up over top of roof plates 70.

To construct a shelter, a hole of greater size than the concete form is first dug into the ground. Side panels 2 having the pressure plates 14 bolted thereto, are then set into the hole, and flanges 6 bolted to each other, and flanges 15 bolted to each other, on the inside of the hole. The side panels 2 are leveled by resting on blocks or upon adjustable feet 110. The halves 20 and 22 of the stairwell panel 4 are then set into place, with their side flanges 6 bolted to the adjoining flanges of panels 2. Halves 20 and 22 are then connected with the angles 26, 34, and 38. Roof plates are then set into place and bolted from the inside by bolts 56 and 58, with ring 50 being closed by a circular plate. The stairwell form is then lowered into place and bolted to flanges 6, 10a, 10b, and 32. Curbing 100 is then set around the edges of the hole and secured to curb 90.

After suitable metal reinforcing has then been placed in the space between the form and the walls of the hole, concrete is then poured. Workmen from the interior of the form watch the flow of concrete flowing beneath the form and under pressure plates 14. The purpose of pressure plates 14 is to prevent the concrete from indiscriminately spilling into the form, and produces sufficient friction so that when the concrete has reached the level of the pressure plates, its flow can be stopped simply by not assisting the flow of concrete by pulling it from beneath the pressure plates, as these plates provide sufficient resistance against the free flow of concrete therebeneath. The workmen then standing on the pressure plates simply smooth over the floor surface.

Concrete is then continued to be poured between the form and the walls of the hole, beneath the stairwell form, and up over the roof panels 70, the height of the concrete being regulated by curbs 90 and 100.

Figure 2:
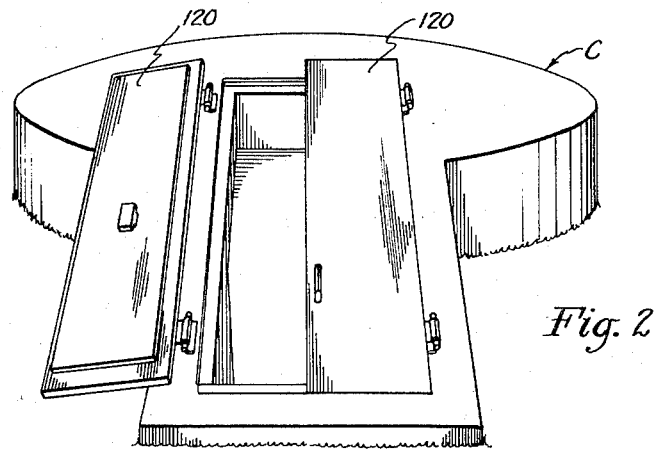
Figure 2 is a perspective view of the completed concrete structure.

After the concrete has set, entry into the form is made through the stairwell. The pressure plate for the stairwell panel 4 is then unbolted, knocked loose, and removed. In connection with all the bolts, it does not matter if the bolt heads remain in the set concrete, the nuts being readily removed from the inside of the form. The angles 26, 34, and 38 are unbolted and removed. A sufficient gap remains between panels 20 and 22 so that these panels can be canted and slipped out of place. When being removed the panels 20 and 22 drop downwardly so that when the roof panel thereabove is unbolted, sufficient clearance exists for the dropping of this roof panel. The removal of this one portion of the form consequently provides sufficient clearance for the successive removal of the roof panels and the remaining side panels, all of which are carried up through the open stairwell, and the stairwell itself finally lifted away. As shown in Figure 2, the roof is completed by the provision of trap doors 120.

The monolithic reinforced concrete structure thus produced is of great strength and gives adequate protection against storms such as tornadoes, and against bomb raids. The structure is waterproof, and may be formed with walls of any thickness, a thickness of some 8 to 12 inches being preferred. The hole for the form can be quickly dug, as with a clamshell digger, with the form being erected, and the concrete poured within a matter of a few hours. By using the pressure plates, the floor slab is poured at the time the entire shelter is constructed, and thus eliminates a separate step for the pouring of the slab. In addition, the monolithic construction tends to make the structure waterproof, so that any additional waterproofing is reduced to a minimum. The concrete form is constructed of sheet metal of appropriate weight, and can be used over and over again for the construction of shelters. Although the shelter has been described with reference to a circular structure, it is obvious that shelters of other shape can also be constructed, as the novel method of pouring the floor slab, and the use of the separate stairwell panel adapt themselves to any shelter shapes which are to be constructed in the manner of the invention. It is further apparent that while the form has been bolted together, other detachable fastening means such as wedges or the like can be substituted for the bolts, as long as they are unfastenable from the interior of the form.

Having now described the means by which the objects of the invention are obtained,

I claim:

A process for forming a monolithic concrete shelter comprising forming a hole in the ground, placing into said hole a concrete form having an open bottom and being of less size than said hole, said form being spaced from the bottom of said hole and having means adjacent the bottom edge of said form for restraining the flow of concrete beneath the bottom edge of said form and a stairwell communicating with a doorway opening, pouring concrete entirely between said form and the sides of said hole above the level of said restraining means and above said form excepting the doorway opening, manually controlling the rate of the flow of concrete by forcing the concrete to flow beneath the bottom edge of the form by the application of a force adjacent said bottom edge, continuing said flow while leveling the concrete flowing beneath said bottom edge to form a floor, stopping the force applied to said concrete adjacent said bottom edge to stop the flow of concrete by said restraining means, setting the concrete, and then dissembling and removing the form through said stairwell and doorway opening from the interior of said shelter.

References Cited in the file of this patent

UNITED STATES PATENTS

| Number | Name | Date |
|---|---|---|
| 578,891 | Moon | Mar. 16, 1897 |
| 584,953 | Mowrey | June 22, 1897 |
| 850,667 | Mitchell | Apr. 16, 1907 |
| 1,013,416 | Massey | Jan. 2, 1912 |
| 1,014,360 | Allen | Jan. 9, 1912 |
| 1,080,187 | Watkins | Dec. 2, 1913 |
| 1,190,256 | Harper | July 4, 1916 |
| 1,867,837 | Jackson | July 19, 1932 |
| 2,068,302 | Nickol | Jan. 19, 1937 |
| 2,159,690 | Fleming | May 23, 1939 |
| 2,524,981 | LeTourneau | Oct. 10, 1950 |
| 2,539,741 | Hayes | Jan. 30, 1951 |
| 2,556,594 | McDonnell | June 12, 1951 |
| 2,653,468 | Rowles | Sept. 29, 1953 |
| 2,729,966 | Lutteke | Jan. 10, 1956 |